Patented Aug. 2, 1932 1,869,530

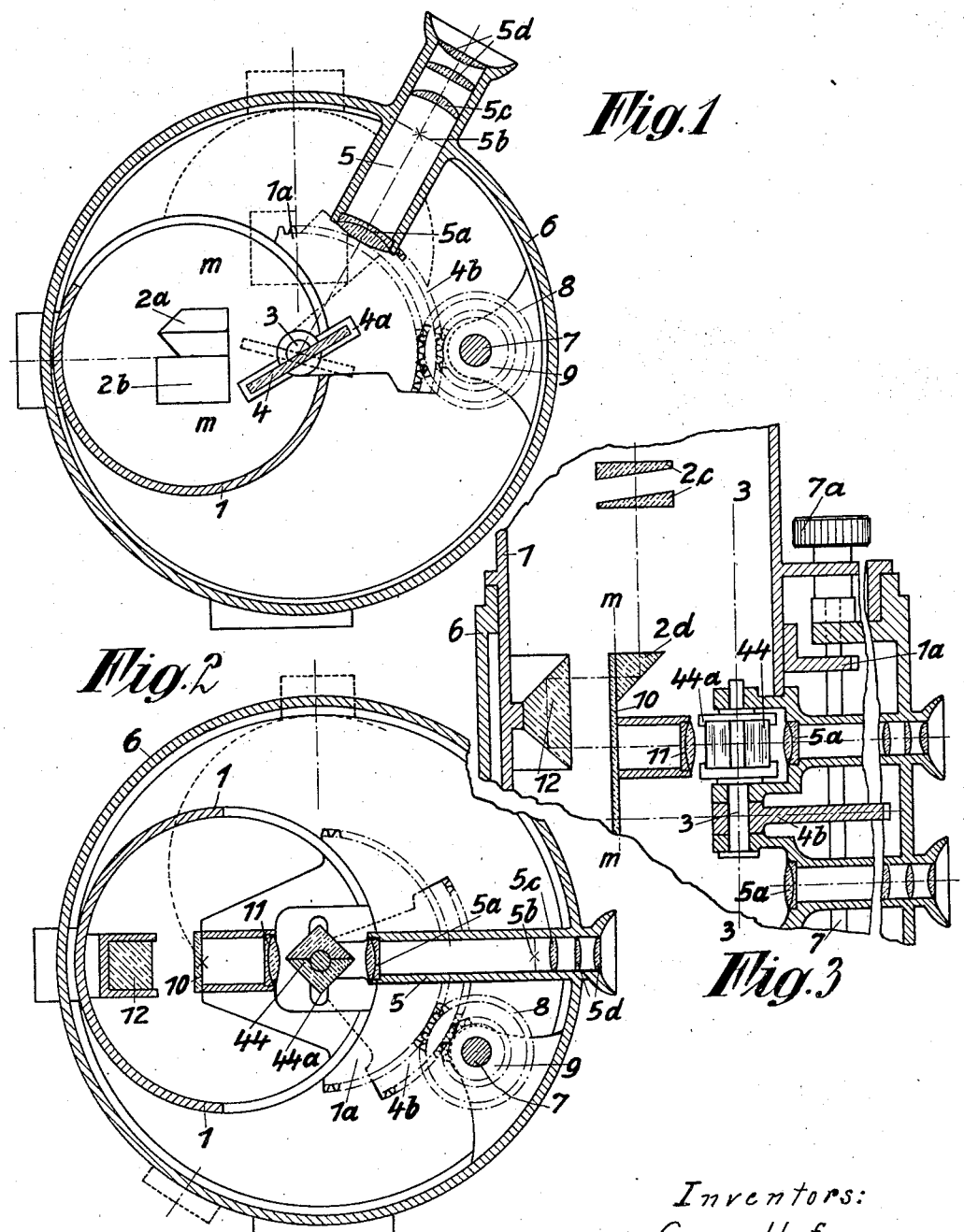

UNITED STATES PATENT OFFICE

CHRISTIAN VON HOFE AND JOHANN SCHIER, OF VIENNA, AUSTRIA, ASSIGNORS TO AKTIENGESELLSCHAFT C. P. GOERZ OPTISCHE ANSTALT, ACTIOVA SPOLECNOST K. P. GOERZ OPTICKY USTAV, OF BRATISLAVA, CZECHOSLOVAKIA, A COMPANY OF CZECHOSLOVAKIA

RANGE FINDER WITH AN INVARIABLE DIRECTION OF THE OPTICAL AXIS OF THE EYEPIECE

Application filed July 8, 1931, Serial No. 549,500, and in Czechoslovakia August 6, 1930.

Our invention has for its object to provide range finders for any angles of altitude of the target, but having an invariable direction of the optical axis of the eye piece.

With this object in view we provide according to our invention a mirror between the plane of the measuring image and the eye piece system, the said mirror being capable of being turned around a horizontal axis in the eye piece casing and being so coupled with the range finder tube by means of gear wheels that the vertical angle of rotation of the range finder tube corresponds to twice the angle of rotation of the mirror.

An embodiment of our invention is shown by way of example in the annexed drawing in which Fig. 1 shows the arrangement in case a plane mirror is used in one form of a range finder. Fig. 2 shows the arrangement in which a system of reflecting prisms is used in another form of a range finder and Fig. 3 shows the central part of the horizontal longitudinal section of the range finder shown in Fig. 2.

In Fig. 1 the horizontal range finder tube 1 carries the image producing and image shifting optical elements of which only the two crossing prisms $2^a$ and $2^b$ are shown which have in common the ray outlet plane $m-m$ on which appear the images of the target produced by the two objective systems and inverted relatively to each other. These images are symmetrical to each other with reference to the plane separating the two prisms. In close proximity to the two prisms there is provided the mirror 4 mounted in a frame $4a$ which is rotatable around the horizontal axis 3 by means of trunnions. The rays coming from the measuring plane $m, m$ enter the eye piece system 5 after having been reflected by the mirror 4. This eye piece system is fixedly mounted in the casing 6 secured to the stand of the instrument. The eye piece system comprises the auxiliary objective $5a$ which produces in the focal plane $5b$ real images of the inverted images in the plane $m, m$ and furthermore the collective lens $5c$ and the ocular lenses $5d$. The tube 1 is rotatable in the casing 6 around an axis coinciding with the axis 3 of rotation of the mirror 4 and has fixed to it a toothed segment $1a$ meshing with a pinion 8 fast on the horizontal shaft 7. A second, smaller pinion 9 fast on the shaft 7 engages into a toothed segment $4b$ fast on the mirror frame $4a$. The pitch circle ratios of the toothed segments and pinions are such that on turning the shaft 7 through any given angle by means of a handle such as $7a$, shown in Fig. 3, the tube 1 is turned through twice this angle around the axis 3 through which the mirror is turned simultaneously. Thus the field of vision is permanently left free as the shaft 7 is turned. Owing to this arrangement the inclination to the horizon of the line of sight to the target may be varied from 0 to about 90° without any change of the inclination of the optical axis of the eye piece.

If, however, the inclination of the line of sight has to be varied through more than 90° that is to say through about 180° without varying the inclination of the optical axis of the eye piece, then instead of the simple mirror 4 the well known cube shaped reflecting prism combination having silvered hypothenuse surfaces has to be used, as shown in Figs. 2 and 3, which requires a pencil of parallel rays of light. For this purpose an auxiliary objective 11 is used between the cube 44 of reflecting prisms and the measuring image $m$, which focuses this image. For permitting to do this practically it is preferable to increase artificially the path of light rays between the measuring mark plate 10, usual in stereoscopic range finders, and the two auxiliary objectives 11, of which only one is shown, by interposing in the path of rays of light at the right and at the left hand side a double reflecting prism 12. The further arrangement is similar to that employed in connection with a simple mirror as shown in Fig. 1. The tube in which only the measuring wedges $2c$ and the image producing prism $2d$ are shown is also in this case rotatable in the eye piece casing 6 around the axis of rotation 3, 3 of the cube 44 and has fixed to it a toothed segment $1a$. The frames $44a$ of the prism combination 44 are rotatable coaxially with the tube 1 and are fast with the toothed segment $4b$. The same as above described these two segments engage into two pinions 8 and 9 fast on a shaft 7. The ratios of the pitch circles of the said segments and pinions are such that on turning the shaft 7 through any given angle the tube 1 together with the line of sight of the target is turned through twice the angle through which the cube 44 is turned. The latter acting in the same way as an infinitely thin mirror reflecting on both sides, by its rotation twice the angle of rotation of the line of sight may be obtained, the same as with a simple mirror.

It is not absolutely necessary that the horizontal axis of rotation of the tube coincides with the axis of rotation of the mirror 4 or 44, but if the two axes of rotation were distant the one from the other, the toothed gearing between the two axes would become so complicated that this arrangement would not offer any advantage over the coaxial arrangement.

What we claim is:

A range finder with an invariable direction of the optical axis of the eye piece comprising a stationary eye piece casing, a horizontal range finder tube rotatable in the said eye piece casing around its horizontal axis, a cube shaped combination of reflecting prisms having contacting silvered hypothenuses, mounted in the said eye piece casing and rotatable therein around a horizontal axis parallel to the axis of the range finder tube, and means comprising toothed gearings for rotating the said range finder tube and the said cube shaped combination of reflecting prisms the ratios of the said toothed gearings being such that the angular speed of the said range finder tube is twice that of the said cube shaped combination of reflecting prisms, and means comprising an auxiliary objective and a reflecting prism interposed between the range finder tube and the said auxiliary objectives for parallelizing the diverging rays of light coming from the said range finder tube before entering the said cube shaped combination of reflecting prisms.

In testimony whereof we affix our signatures.

CHRISTIAN von HOFE.
JOHANN SCHIER.